Feb. 27, 1934.　　　R. W. BARKER　　　1,948,641
AUTOMATIC MACHINE FOR FEEDING AND CUTTING SHEET MATERIAL
Filed June 7, 1932　　　4 Sheets-Sheet 1
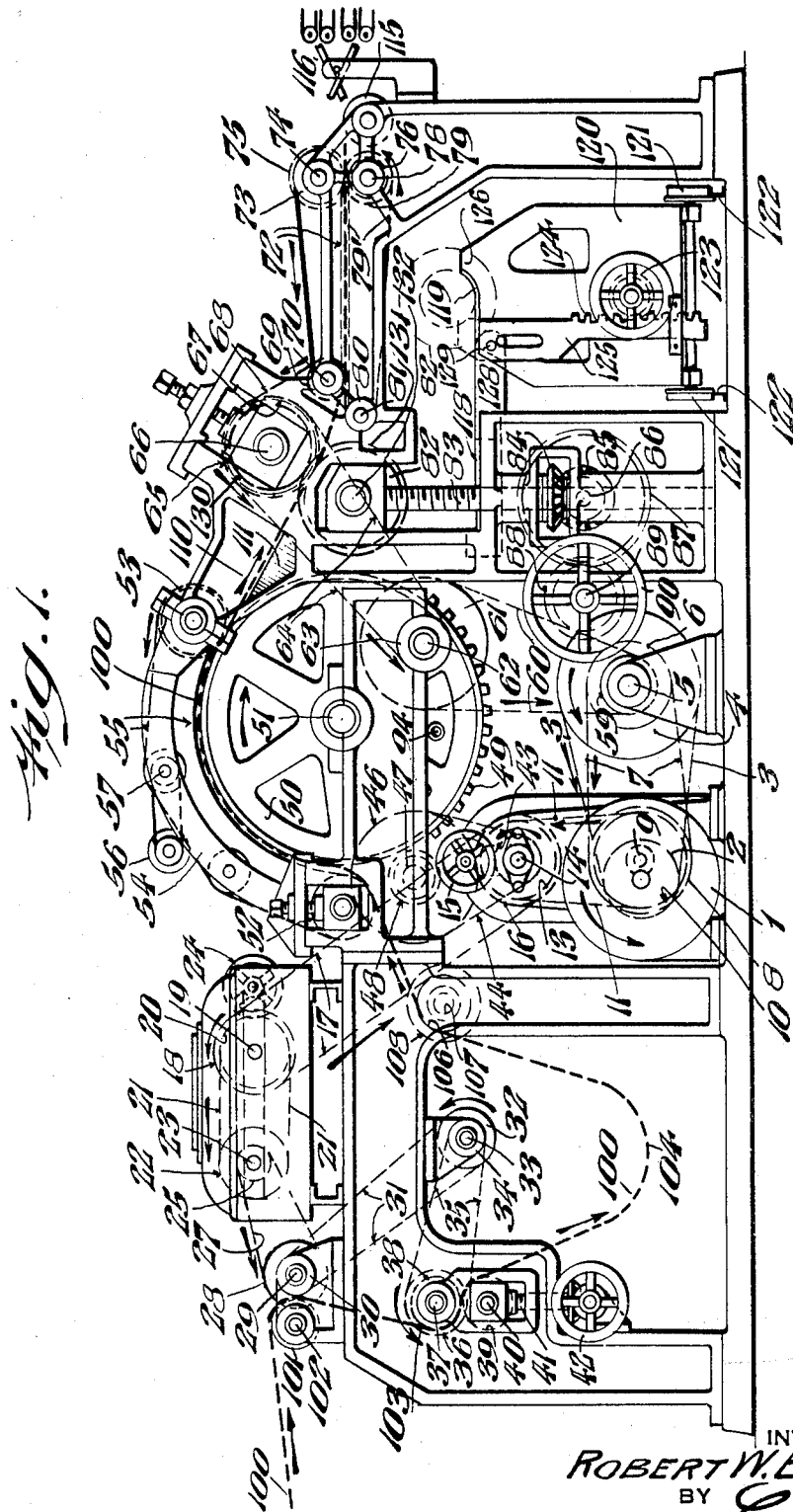
INVENTOR
ROBERT W. BARKER,
BY Louis Necho
ATTORNEY Feb. 27, 1934.   R. W. BARKER   1,948,641
AUTOMATIC MACHINE FOR FEEDING AND CUTTING SHEET MATERIAL
Filed June 7, 1932   4 Sheets-Sheet 2
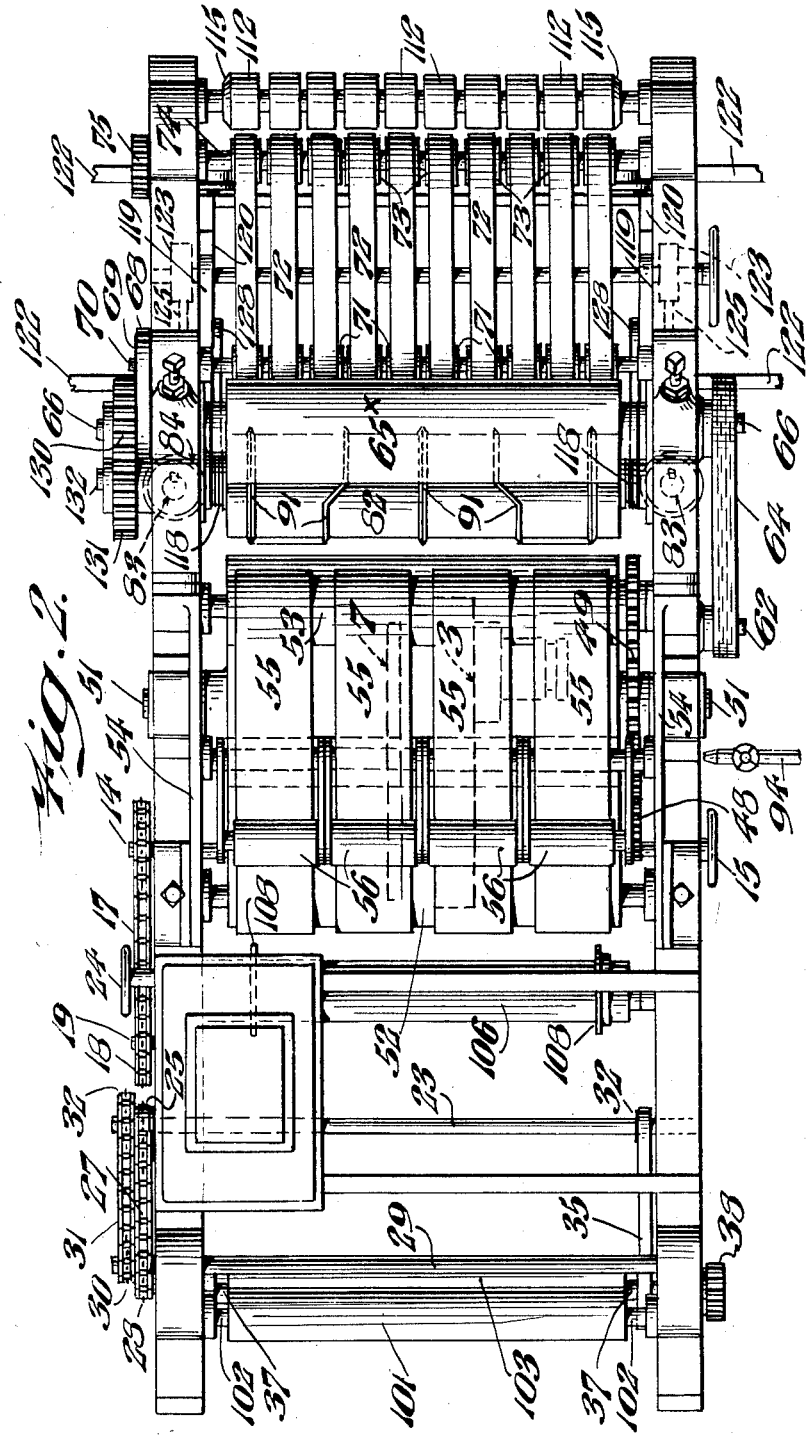
INVENTOR
ROBERT W. BARKER,
BY
Louis Necho
ATTORNEY Feb. 27, 1934.　　　R. W. BARKER　　　1,948,641
AUTOMATIC MACHINE FOR FEEDING AND CUTTING SHEET MATERIAL
Filed June 7, 1932　　　4 Sheets-Sheet 3
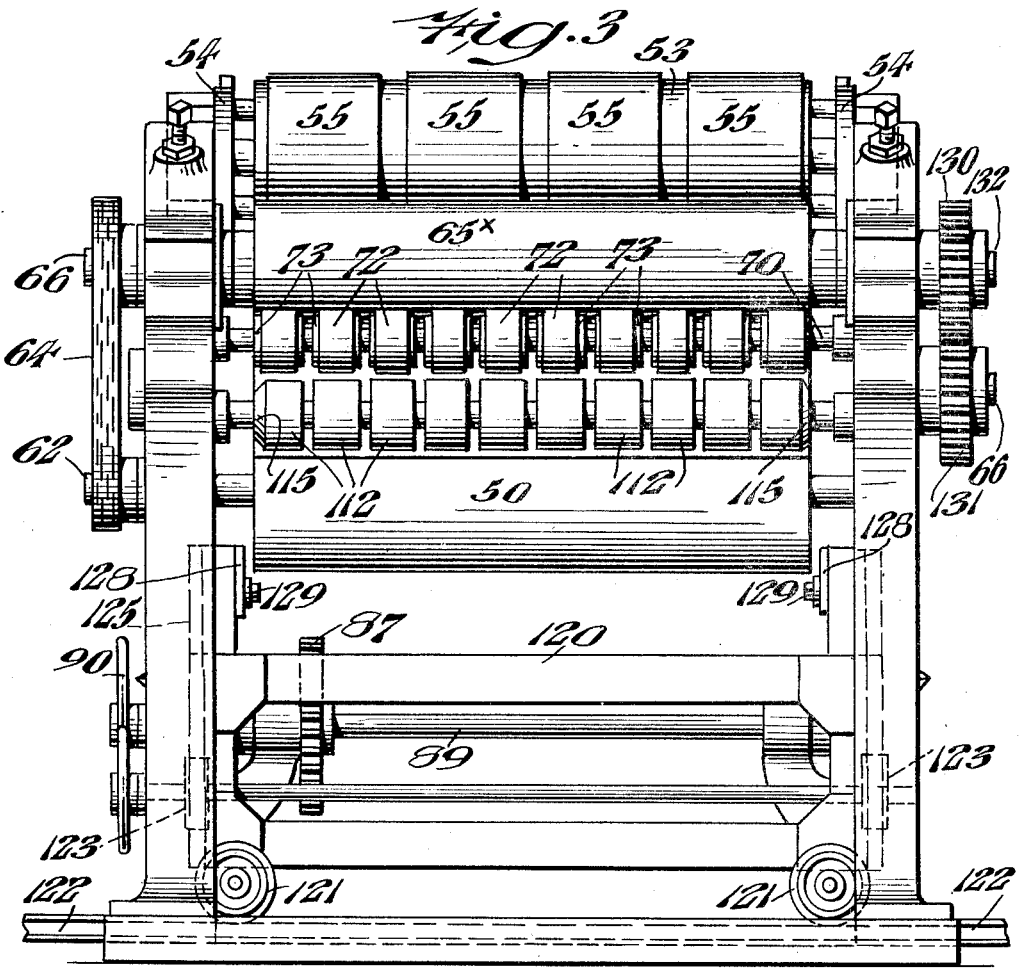
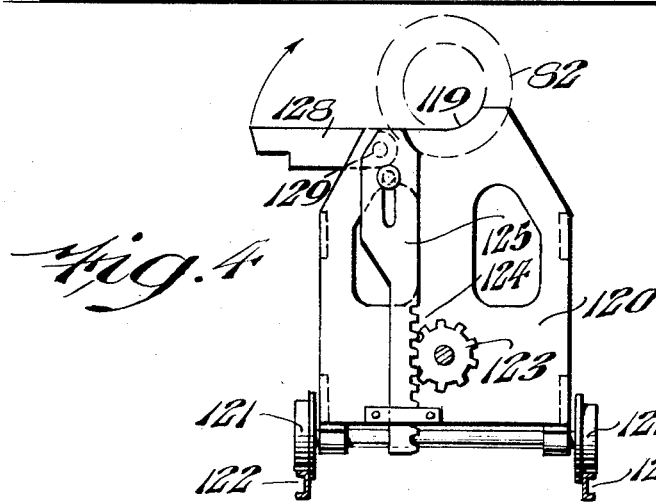
INVENTOR
ROBERT W. BARKER,
BY Louis Necho
ATTORNEY Feb. 27, 1934. R. W. BARKER 1,948,641
AUTOMATIC MACHINE FOR FEEDING AND CUTTING SHEET MATERIAL
Filed June 7, 1932 4 Sheets-Sheet 4

INVENTOR
ROBERT W. BARKER,
BY Louis Necho
ATTORNEY

Patented Feb. 27, 1934

1,948,641

UNITED STATES PATENT OFFICE 1,948,641

AUTOMATIC MACHINE FOR FEEDING AND CUTTING SHEET MATERIAL

Robert W. Barker, Philadelphia, Pa.

Application June 7, 1932. Serial No. 615,789

9 Claims. (Cl. 164—68)

My invention relates to a new and useful automatic machine for feeding and cutting sheet material whereby such sheet material may be cut into sections of any desired contour in an expeditious, efficient, and automatic manner.

My invention further relates to a machine of this character which is so designed as to improve the manner of feeding the sheet material to be cut both by regulating and controlling the rate of feeding the material into the machine relative to the cutting and delivery operation thereof, and in which the sheet material to be delivered from the feeding mechanism to the cutting mechanism is fed in an inclined or generally downward direction thereby preventing the sagging of the sheet material and greatly decreasing the amount of frictional traction which might otherwise be necessary for the proper propulsion or feeding of the material, particularly when the material to be fed and cut is a roofing material of a heavy and rather plastic constituency having a high frictional index.

My invention further relates to a machine of this character which includes novel means for feeding mechanisms are controlled and regulated by variable speed connection to produce correlated, accurate adjustment.

My invention still further relates to a machine of this character whihch includes novel means for greatly facilitating the manipulation of the heavy and unwieldy cutter roll or rolls, in that the assembling of such cutter rolls in position in the machine and the withdrawal of such cutter rolls for the purpose of cleansing, replacement or repair is greatly facilitated.

My invention still further relates to a machine of this character wherein a positive drive is provided for the main propelling element of the feeding mechanism, said propelling element being also provided with a maximum surface frictional traction to insure uniform and proper feeding of the sheet material to the cutter rolls.

My invention still further relates to a machine of this character which includes cooling means for offsetting the heat of the material to be fed and cut or heat that may develop due to friction.

My invention still further relates to a machine of this character wherein the cutter rolls, in addition to being easily and expeditiously applied to or withdrawn from the machine, are also mechanically raised and lowered for accurate adjustment to the thickness of the material being fed and cut.

My invention still further relates to a machine of this character wherein the propelling as well as the cutting means are readily adjustable to the width of the sheet material to be fed and cut.

My invention still further relates to a machine of this character which is provided at the delivery end thereof with means for separating the shingles or other strips into which the sheet material is cut and for separating from the cut shingles or strips any waste or edge trimmings which may be present.

My invention still further relates to various other features of construction and advantage, all as hereinafter described and claimed in connection with the accompanying drawings, in which:

Figure 1 is a side elevation of a sheet material feeding and cutting machine embodying my invention.

Figure 2 is a plan view of Figure 1.

Figure 3 is an end elevation of the delivery end of the machine.

Figure 4 is an end view of the cutter roll carrier which appears in the right hand portion of Figure 1 shown detached from the machine.

Figure 5:
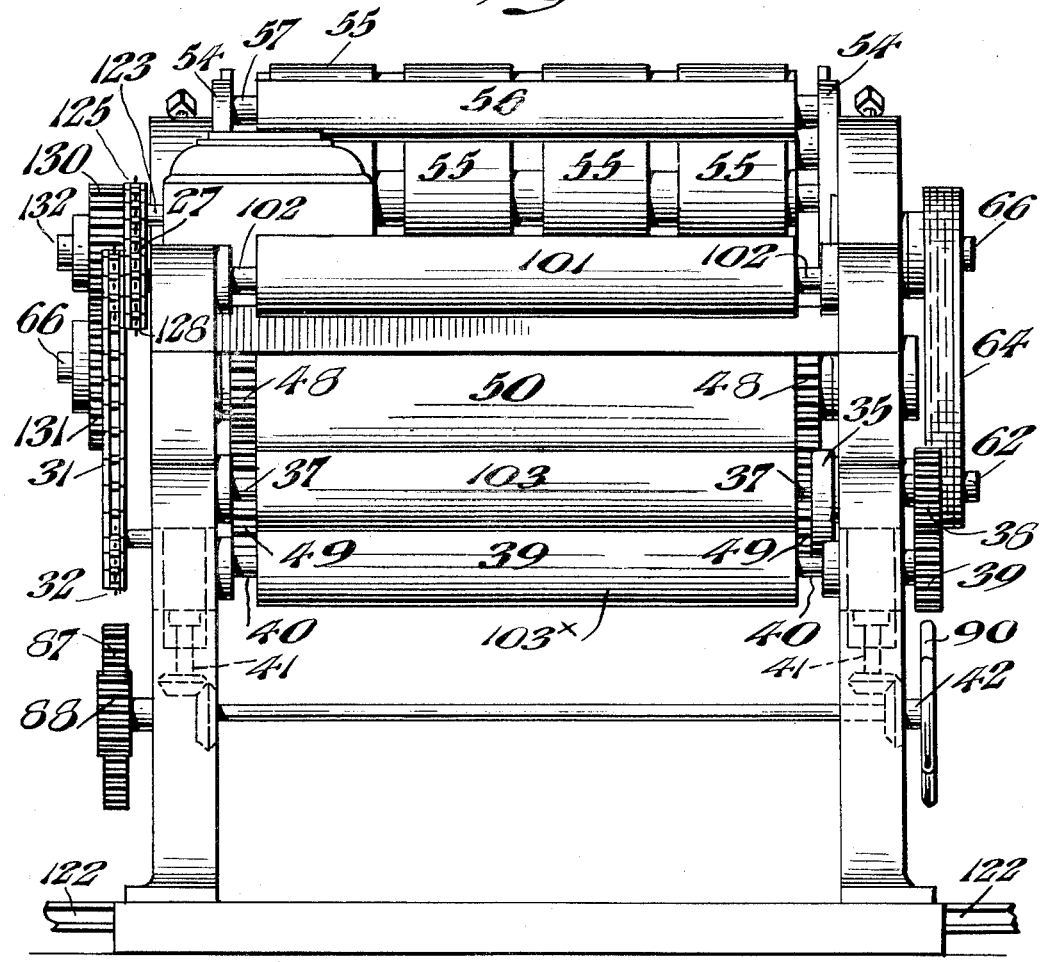
Figure 5 represents a front elevation of the machine.

Referring to the drawings in which like reference characters indicate like parts, 1 designates a motor which revolves the pulley 2 over which travels the driving connection 3 which also passes over the pulley 4 on the shaft 5. The shaft 5 carries the pulley 6 over which travels the driving connection 7 which also engages the pulley 8 on the shaft 9 which carries the pulley 10. The driving connections 11 pass over the pulley 10 and over the pulley 13 on the shaft 14. The pulleys 10 and 13 are of the variable speed variety and are regulated by the hand wheel 15. On the shaft 14 is the pulley 16 over which passes the driving connection 17 which also passes over the pulley 18 on the shaft 19 which carries the pulley 20 over which passes the belting or other driving connection 21 which also passes over the pulley 22 on the shaft 23. The pulleys 20 and 22 are of the variable speed variety and are regulated by the hand wheel 24. On the shaft 23 is the pulley 25 over which passes the driving connection 27 which also passes over the pulley 28 on the shaft 29 which also carries the pulley 30 over which passes the driving connection 31 which also passes over the pulley 32 on the shaft 33 which also carries the pulley 34 over which passes the drive 35 which also engages the pulley 36 on the shaft 37 which carries the gear 38. The gear 38 coacts with the gear 39 on the shaft 40 to transmit motion from the shaft 37 to the shaft 40, the gear 39 being adjusted vertically on the threaded stem 41 by the hand wheel 42. On the shaft 14 is the pulley 43 over which passes the drive 44 which engages the pulley 46 mounted on the shaft 47 which also carries the pinion 48 which meshes with gear 49 on the drum 50 which is mounted on the shaft 51. Coacting with the drum 50 are the rollers 52 and 53 which are mounted in the frame work 54 and over which travels the belting 55. The belting 55 may be driven by frictional engagement with the material fed over the drum 50 or it may be provided with a positive drive in any desirable manner and is tensioned by means of a tension roll 56 which is pivoted to the frame work 54 at 57. The shaft 5 carries the pulley 59 over which travels the drive 60 which also engages the pulley 61 on the shaft 62. The shaft 62 carries the pulley 63 over which passes the drive 64 which also engages the pulley 65 on the shaft 66. The shaft 66 carries the pulley 67 over which travels the belting 68 which also engages the pulley 69 on the shaft 70. The shaft 66 also carries the smooth roll 65x which is hereinafter referred to. The shaft 70 carries a plurality of sheaves 71 over which passes the belting 72 which also engages corresponding sheaves 73 on the shaft 74 which also carries the hand gear 75 which meshes with the gear 76 on the shaft 78. The shaft 78 carries a plurality of sheaves 79 corresponding to and vertically aligning with the sheaves 73 and over which passes the beltings 79' which corresponds to and vertically aligns with the belting 72, said belting also passing over a corresponding plurality of sheaves 80 on the shaft 81, the sheaves 80 corresponding to the sheaves 71 on the shaft 70. 82 designates a cutter roll carried by the threaded stem 83 which is raised and lowered and adjusted vertically by the pinion 84 which engages the gear 85 on the shaft 86 which also carries the gear 87 which meshes with the gear 88 on the shaft 89 which is revolved by the hand wheel 90. The cutter roll 82 is provided with suitably shaped or formed knives 91 for cutting the material fed into the machine into any desired shapes and forms. The drum 50 may be provided with a suitable inlet 90 through which cold water may be introduced if desired.

The material to be fed and cut, such as roofing material to be cut into shingles, is designated by the reference numeral 100 and is fed over the roller 101 on the shaft 102 and between the roller 103 on the shaft 37, and the roller 103x on the shaft 40, the latter having been adjusted by manipulation of the wheel 42 to the proper distance with respect to the stationary shaft 37. The material 100 then passes downwardly to form the loop 104 and then passes upwardly over the roller 106 on the shaft 107, said roller 106 being provided with the adjustable lateral guides 108 which may be brought together or spread farther apart according to the width of the material 100 to pass therebetween. The material 100 then passes between the belting 55 which travels over the rolls 52 and 53 and the surface of the drum 50 which is propelled by the gear 49. This effects a positive traction or propulsion of the material which then emerges in the direction of the arrow 110 whence it slides in a downward direction over the inclined guide plate 111. From the guide plate 111 the material is fed between the revolving smooth roll 65x and the juxtaposed coacting cutter roll 82 on the stem 83. The knives 91 on the cutter roll 82 cut the material 100 into shingles of any desired form and the cut material then travels between the beltings 72 and 79 and out over the roll 112. The rollers 112 are made in sections or individual units in order to permit adjustment to the width of the material by increasing or decreasing the number of units and the outer or end rollers are provided with bevelled edges 115 which serve to separate the waste trimmings or marginal strips which may have been cut from the body of the material 100. After the material has been cut it is separated by the conventional separating mechanism 116 which is not described in detail since its structure is conventional and forms no part of the present invention. When it is necessary to change the knife pattern on the cutter roll 82 or for any other reason to withdraw the cutter roll 82 from the machine and to replace it by another one, the hand wheel 90 is turned and through the gears 88, 87, 85 and 84 the stem 83 is lowered and the cutter roll 82 now rests on the track 118. Upon being disengaged from its bearings the grooved end hubs of the cutter roll 82 travel over the tracks 118 into the concaved head 119 of the carriage 120 which has the wheels 121 travelling over the rails 122. The grooved end hubs of the roll 82, engaging the tracks 118, serve to guide the roll on its way to the carriage 120. When the cutter roll 82 is seated in the concaved seat 119, the hand wheel 123 is turned to operate the rack and pinion construction 124 to raise the movable jaw 125 to the level of the fixed jaw 126, said jaws being adapted to engage the cutter roll 82 and retain it in position. The carriage 120 is provided with an arm 128 which is pivoted at 129, which arm is adapted to be folded upwardly in the direction of the arrow in Figure 4 to permit withdrawal of the carriage 120 out of the machine and which when in the horizontal position shown in Figures 1 and 4 forms part of the track 118 for the roll 82 to travel upon on its way to the carriage 120. Similarly, when it is necessary to put in a cutter roll, the same is placed on the carriage 120 and the latter is rolled into position within the machine whereupon the pivoted arm 128 is lowered into the horizontal position shown in Figure 1 and the roll 82 is then rolled over the tracks 118 into the position shown in Figure 1. The shaft 66 also carries the gear 130 which meshes with the gear 131 on the shaft 132 which carries the cutter roll 82 to provide a positive drive for the latter.

It is to be noted that the feeding of the material 100 between the belting 55 and the drum 50 engages the material to a great amount of frictional surface contact and traction so that it is more easily and evenly propelled and by feeding the material in the direction of the arrow 110 over the guide plate 111 between the smooth roll 65x and the cutter roll 82 prevents the sagging of the material prior to and during the cutting operation and thus tends to produce more accurate and more uniform results. It is also to be noted that my novel arrangement for introducing and withdrawing the relatively large and heavy cutter rolls into and from the feeding and cutting machine reduces to a minimum the amount of manual labor involved and obviates the necessity of dismantling any part of the machine for the purpose of withdrawing, introducing or adjusting the cutter roll. It is also to be noted that the bevelled edges 115 of the rollers 112 serve a very important function in separating the marginal waste trimmings which result when the longitudinal edges of the material to be fed and cut are ragged or not uniform. It will also be seen that from a single source of power, which may be a motor positioned at any suitable position in the machine or which may be a take-off from a main shaft, I drive all the parts of the machine in synchronized variable speed fashion to regulate the feeding of the material with respect to the cutting and delivery thereof, thereby accomplishing continuous, uniform, efficient and automatic operation.

Having thus described my invention, what I claim as new and desire to secure by Letters Patent is:

1. In a feeding and cutting machine of the character stated, a plurality of variable speed feeding devices adapted to propel a sheet material, means for guiding said sheet material, means for cutting said sheet material positioned generally below said feeding means, means for propelling the cut material, to the delivery end of said machine, and means for separating the trimmings from the cut material.

2. In a feeding and cutting machine of the character stated, a plurality of variable speed feeding devices adapted to propel a sheet material, means for guiding said sheet material, means for cutting said sheet material positioned generally below said feeding means, and means for propelling and separating the cut material.

3. In a feeding and cutting machine of the character stated, a plurality of variable speed feeding devices adapted to propel a sheet material, means for guiding said sheet material, means for cutting said sheet material positioned generally below said feeding means, means for propelling the cut material, and means at the delivery end of the machine for separating the cut material from the marginal waste trimmings resulting from the cutting of said sheet material 4. In a sheet material feeding and cutting machine, a revolving structure, a belt drive coacting therewith, variable speed devices for feeding a sheet material through said machine, means for guiding said sheet material to cause it to enter between said revolving structure and said drive belt, means for cutting said sheet material, said cutting means being lower than said revolving structure, and means for withdrawing the cut sheet material from said machine.

5. In a sheet material feeding and cutting machine, a revolving structure, a belt drive coacting therewith, variable speed devices for feeding a sheet material through said machine, means for guiding said sheet material to cause it to enter between said revolving structure and said drive belt, means for cutting said sheet material, said cutting means being lower than said revolving structure, and means for withdrawing and separating the cut sheet material from said machine.

6. In a sheet material feeding and cutting machine, a revolving structure, a belt drive coacting therewith, variable speed devices for feeding a sheet material through said machine, means for guiding said sheet material to cause it to enter between said revolving structure and said drive belt, means for cutting said sheet material, said cutting means being lower than said revolving structure, means for withdrawing the cut sheet material from said machine, and means at the delivery end of the machine for separating the waste trimmings which may result from the cutting operation from the cut material.

7. In a sheet material feeding and cutting machine, a revolving structure, a belt drive coacting therewith, variable speed devices for feeding a sheet material through said machine, means for guiding said sheet material to cause it to enter between said revolving structure and said drive belt, means for cutting said sheet material, said cutting means being lower than said revolving structure, means for withdrawing and separating the cut sheet material from said machine, and means for separating the cut material.

8. The combination with a feeding and cutting machine of the character stated, including a cutter roll, of means for installing and withdrawing said roll, comprising a carriage adapted to travel into and out of position with respect to said machine and to carry said roll, a fixed jaw on the top of said carriage, a vertically movable jaw adapted to coact with said fixed jaw to hold said roll, and an arm pivoted to said carriage and adapted to form a track to permit said cutter roll to roll off said carriage.

9. In a feeding and cutting machine of the character stated, a plurality of variable speed feeding devices adapted to propel a sheet material, means for guiding said sheet material, a cutter roll for cutting said sheet material, means for adjusting said cutter roll, and means for applying said roll to said machine and for detaching and withdrawing said roll from said machine, including a carriage adapted to receive said roll and manipulating members for depositing said roll on said carriage and for removing said roll from said carriage.

ROBERT W. BARKER.